United States Patent
Sailing

(10) Patent No.: US 6,533,507 B2
(45) Date of Patent: Mar. 18, 2003

(54) SPINDLE TOOL HOLDER TENSION TESTING KIT

(76) Inventor: Jerome D. Sailing, 20 H St. Southeast, Auburn, WA (US) 98002-5609

( * ) Notice: Subject to any disclaimer, the term of this patent is extended or adjusted under 35 U.S.C. 154(b) by 0 days.

(21) Appl. No.: 10/062,884

(22) Filed: Jan. 30, 2002

(65) Prior Publication Data

US 2002/0164220 A1 Nov. 7, 2002

Related U.S. Application Data

(60) Provisional application No. 60/289,215, filed on May 7, 2001.

(51) Int. Cl.[7] ............................. B23C 9/00; B01N 3/08
(52) U.S. Cl. .......................... 409/131; 73/831; 73/832; 73/862.392; 73/862.49; 409/233
(58) Field of Search ................................ 409/131, 233, 409/232; 73/862.542, 862.49, 832, 831, 862.392; 29/283

(56) References Cited

U.S. PATENT DOCUMENTS

| | | | |
|---|---|---|---|
| 4,856,349 A | 8/1989 | Huser | 73/862.54 |
| 4,944,643 A | 7/1990 | Lehmkuhl | 409/80 |
| 5,342,155 A * | 8/1994 | Harroun | 409/131 |
| 5,741,981 A | 4/1998 | Ling et al. | 73/862 |
| 6,453,751 B1 * | 9/2002 | Schlagenhauf | 73/831 |

FOREIGN PATENT DOCUMENTS

EP 356636 A2 * 3/1990 .................. 409/233

* cited by examiner

*Primary Examiner*—William Briggs
(74) *Attorney, Agent, or Firm*—Dean A. Craine

(57) ABSTRACT

A spindle tension testing kit designed to allow mill operators to quickly and easily determine the gripping or holding force of the coupler and drawbar assembly on a spindle against the tool holder used with a milling or other machine using this method of tool retention. In one embodiment, the kit includes a tool holder, an upper frame member, a transfer rod, a clevis member, and a modified pull stud, and a hydraulic piston. The upper frame member threadingly connects to the transfer rod that is longitudinally extended into the central bore formed in the tool holder. The frame member includes a central opening with a lower horizontal member designed to receive a clevis member. The clevis member is a U-shaped member disposed in an inverted, longitudinally aligned position over the lower horizontal member on the frame member so that its legs are adjacent to the top surface of the tool holder when assembled. Attached to the second end of the transfer rod that extends through the tool holder is the modified pull stud. During use, the hydraulic piston exerts a pulling force on the transfer rod which is measured by a pressure gauge to determine whether the connection between the coupler and the modified pull stud is within factory limits.

19 Claims, 6 Drawing Sheets

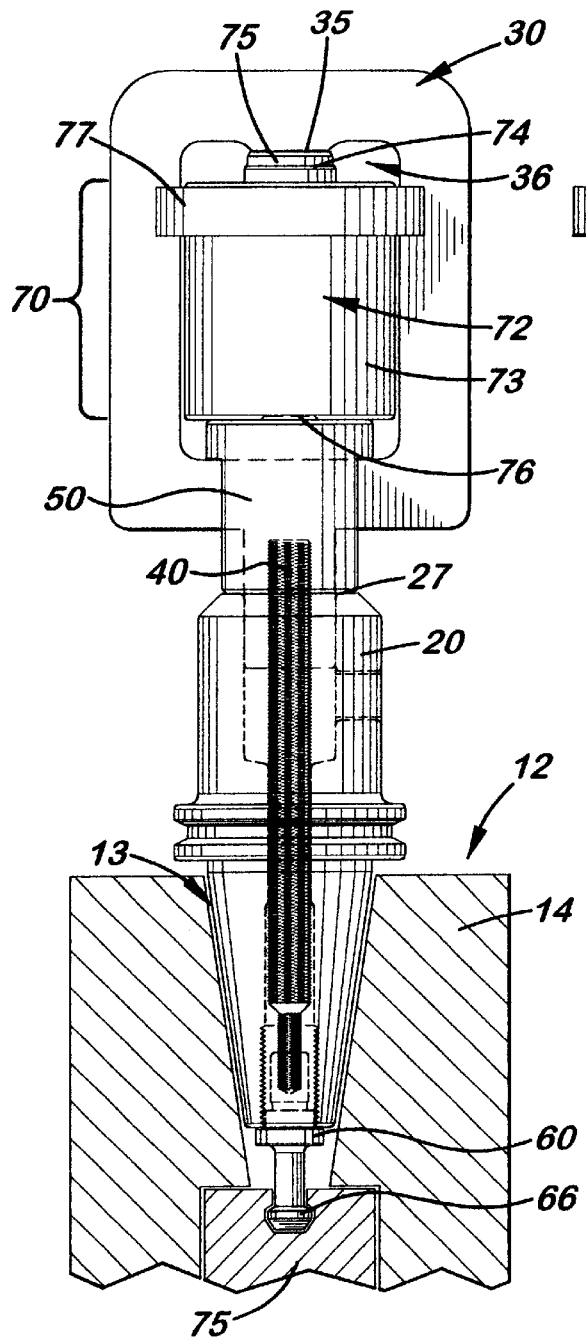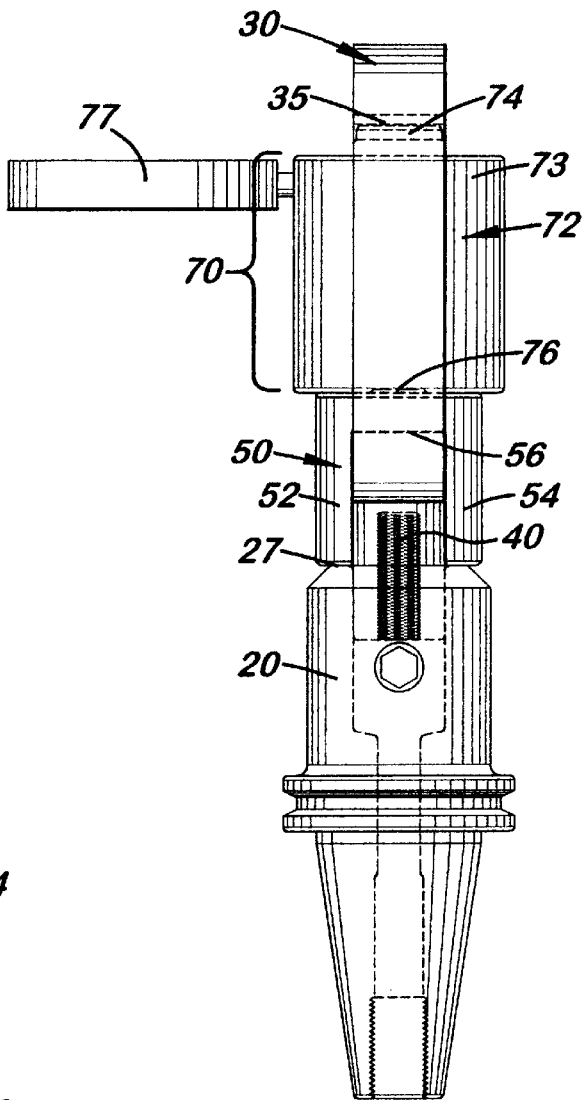
FIG. 2
FIG. 3

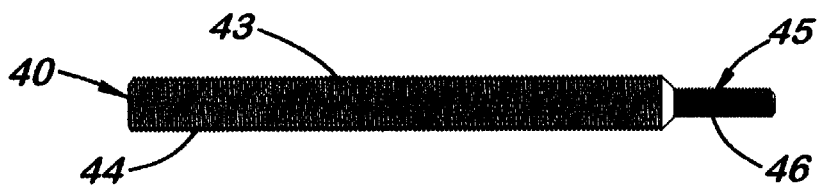
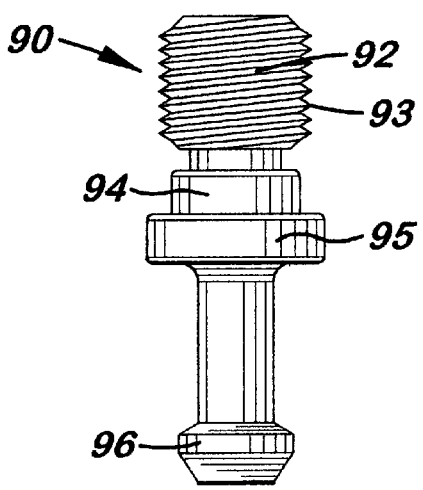
FIG. 8
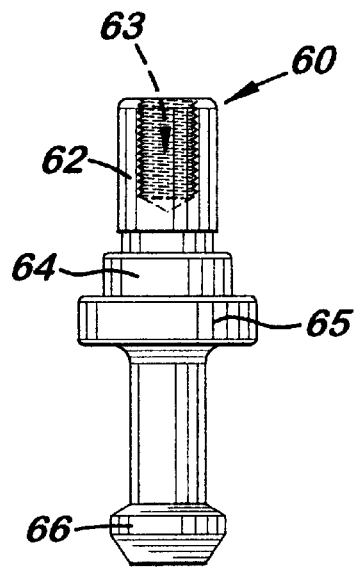
FIG. 9
(PRIOR ART)
FIG. 10
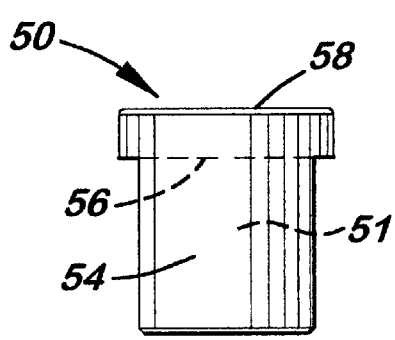
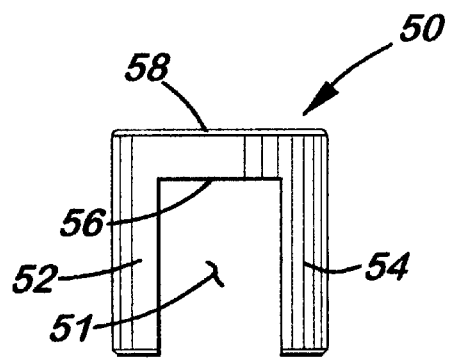
FIG. 11
FIG. 12

SPINDLE TOOL HOLDER TENSION TESTING KIT

This utility patent application is based on a provisional patent application (Ser. No. 60/289,215) filed on May 7, 2001.

BACKGROUND OF THE INVENTION

1. Field of the Invention

This invention pertains to tool holders used with spindles on a milling machine, and more particularly with kits used to measure the amount of tension force exerted by the drawbar mechanism to hold the tool holder on the spindle.

2. Description of the Related Art

Spindles are commonly used with tool holders (also known as arbors) to hold tools or cutting heads on a milling machine. Each spindle typically includes a drawbar assembly and a coupler which securely hold the tool holder. Each tool holder includes a conical-shaped body which is placed inside a complementary-shaped receiving space formed on the drawbar assembly. Attached to the tip of the tool holder is a pull stud which engages a complementary-shaped slot formed on a coupler located inside the drawbar assembly. During use, considerable force is exerted on the pull stud and the sides of the tool holder by the coupler and drawbar assembly, respectively, so that the tool holder does not wobble or move inward and outward. If the force exerted by the coupler or drawbar assembly is inadequate, the tool holder can partially disengage from the spindle thereby causing operator injuries, damage to the tool, diminished cutting head life, damage to the work piece, and inaccurate cuts or bores.

During use, the coupler and drawbar assembly undergo normal wear and tear which gradually reduces its gripping or holding force on the pull stud. Typically, these components must be rebuilt or re-manufactured within a few years depending on the number of uses and the type of work. Generally, re-built or re-manufactured components need repairing or re-manufacturing sooner than new components.

What is needed is a kit that enables operators to accurately and easily measure the coupler and drawbar assembly gripping and holding capacity to determine whether they are operating within factory limits.

SUMMARY OF THE INVENTION

It is an object of the present invention to provide a kit designed to be used with the spindle on a milling machine to accurately and easily measure its gripping or holding force.

It is another object of the present invention to provide such a kit that uses mechanical parts sufficiently durable for use in a machine shop environment.

It is a further object of the present invention to provide such a kit that enables the operator to easily calculate the amount of force exerted by the coupler and drawbar assembly on a tool holder to determine if the coupler and drawbar assembly need to be rebuilt or replaced.

These and other objects of the invention that will become apparent are met by a spindle tension testing kit designed to allow mill operators to quickly and easily determine the gripping or holding force of a drawbar assembly on a tool holder. Using the kit, the operator is able to periodically determine whether the coupler and drawbar assembly are operating within factory limits.

The kit includes a force-exerting means that attaches to the distal or second end of a transfer rod that is longitudinally aligned inside the central bore formed on a tool holder. The proximal or first end of the transfer rod is selectively connected to a modified pull stud that is inserted into the drawbar assembly. The end of the modified pull stud is attached to a coupler on the draw bar assembly. The force-exerting means is used to create a pulling force on the transfer rod to test the holding force of the coupler on the modified pull stud. In the first embodiment, the force-exerting means includes an upper frame member that attaches to the second end of the transfer rod, a clevis member, and a pressure gauge. The upper frame member includes a central opening designed to receive the clevis member and a force-exerting means. The clevis member is a U-shaped member that is disposed in an inverted, longitudinally aligned position over a transversely aligned lower member on the upper frame member. When the upper frame member is selectively connected to the transfer rod and the transfer rod is inserted through the central bore formed in the tool holder, the legs on the clevis member extend downward over the lower member on the upper frame member and press against the adjacent end of the tool holder.

The force-exerting means is disposed inside the central opening inside the upper frame member and is used to selectively exert pressure against the clevis member, forcing the legs of the clevis member against the adjacent end of the tool holder. When the tool holder is inserted into the drawbar assembly and the modified pull stud is captured by the coupler, the force-exerting means is selectively operated to gradually exert a separating force between the upper frame member and the clevis member thus pulling the modified pull stud outward from the coupler. By measuring the amount of pressure exerted by the force-exerting means against the clevis member and the upper frame member, the user can determine if the holding force of the coupler on the modified pull stud is within factory limits. In the first embodiment, the force-exerting means is a hydraulically controlled jack with a moving piston capable of measuring and displaying pressure in 100 lbs. per square inch units. The contact surface area of the plunger and the contact surface area of the upper transversely aligned member have areas of surface of one square inch so that the operator may easily measure the tension force in units commonly used by spindle manufacturers.

In a second embodiment, the clevis member and upper frame member are replaced by a sealed measurement unit that includes a piston that moves longitudinally inside a closed cylindrical body. The piston is threadingly connected to the second end of the transfer rod that extends from the distal end of the tool holder. The proximal end of the cylindrical body is placed against the distal end of the tool holder. When the piston is tightened on the transfer rod, the piston is drawn downward into the cylindrical body. A cavity, filled with hydraulic fluid, is formed inside the cylindrical body which expands and compresses as the piston moves inside the cylindrical body. A pressure gauge attached to the cylindrical body measures the hydraulic pressure inside the cavity which informs the user when the desired amount of pulling force exerted on the coupler has been reached. The surface area of the cavity is calibrated to measure in one-square-inch readings.

BRIEF DESCRIPTION OF THE DRAWINGS

FIG. 2 is a front elevational view showing the spindle tool holder tension kit assembled on a tool holder.

FIG. 3 is a side elevational view of the spindle tool holder tension testing kit shown in FIG. 2.

FIG. 8 is a side elevational view of the transfer rod.

FIG. 9 is a front elevational view of a pull stud found in the prior art.

FIG. 10 is a front elevation of a second embodiment of the modified pull stud with external threads removed, so as to be used in the kit.

FIG. 11 is a front elevational view of the clevis member.

FIG. 12 is a side elevational view of the clevis member.

DESCRIPTION OF THE PREFERRED EMBODIMENT(S)

Figure 1:
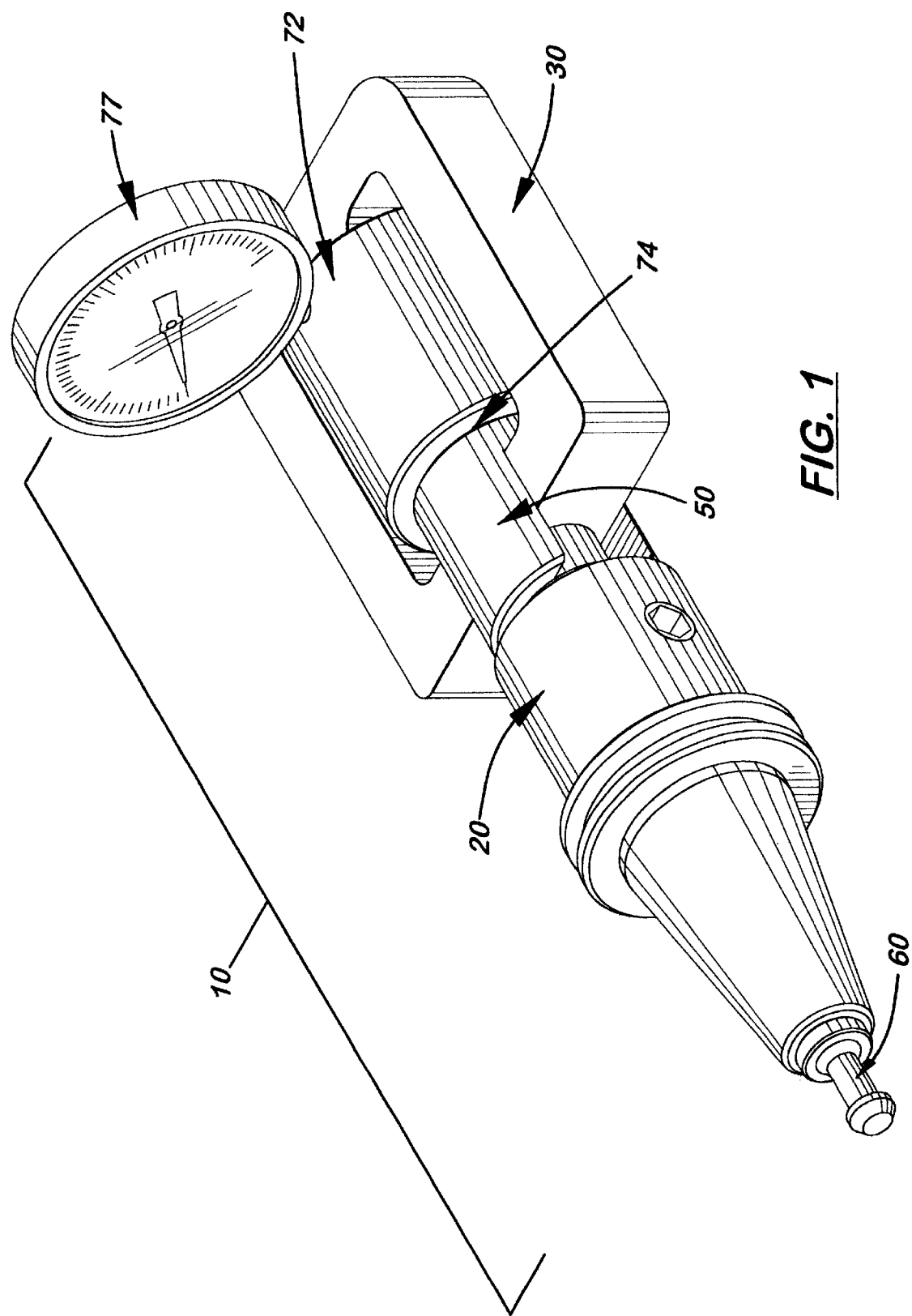
FIG. 1 is a perspective view of the spindle tool holder tension testing kit attached to a tool holder.

Referring to the accompanying FIGS. 1–3, there is shown and described a spindle tool holder tension testing kit, generally referenced as 10, designed to allow mill operators or maintenance personnel to quickly and easily determine if the gripping or holding force of a drawbar assembly 14 on a tool holder 20 when attached to the milling machine spindle 12 is within normal limits. The kit 10 is designed to be easily assembled and attached to the spindle 12 so that an operator may periodically check the holding force of the coupler 15 on a drawbar assembly 14.

The kit 10 includes a tool holder 20, an upper frame member 30, a transfer rod 40, a clevis member 50, a modified pull stud 60, and a force-exerting means 70. During use, the components 20, 30, 40, 50, 60, and 70 are assembled together so that when the tool holder 20 is inserted into the receiving space 13 on a spindle 12, the modified pull stud 60 can be attached to the coupler 15 and the pulling or inward force exerted by the coupler 15 can be easily determined.

Figure 4:
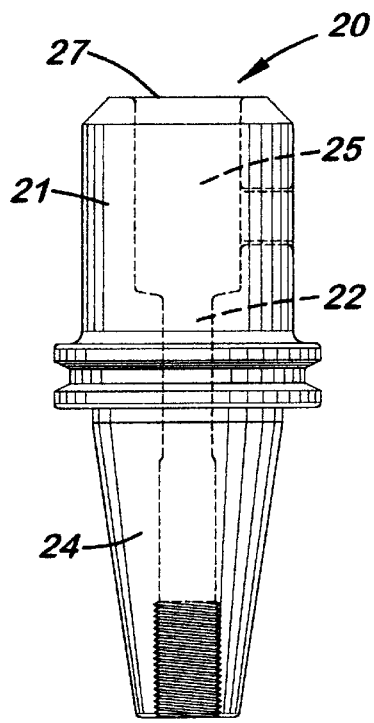
FIG. 4 is a front elevational view of the spindle tool holder tension testing kit.
Figure 5:
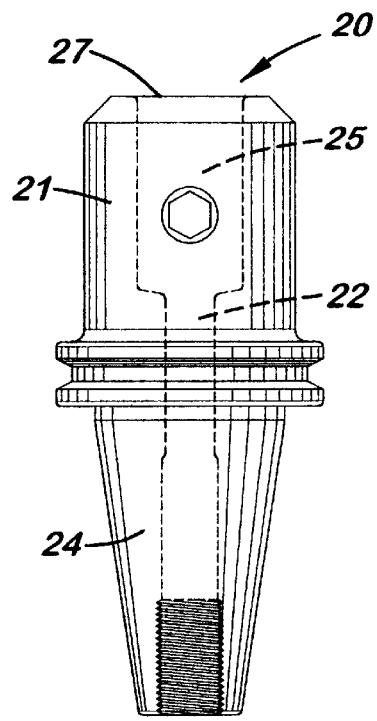
FIG. 5 is a side elevational view of the spindle tool holder tension testing kit.
Figure 6:
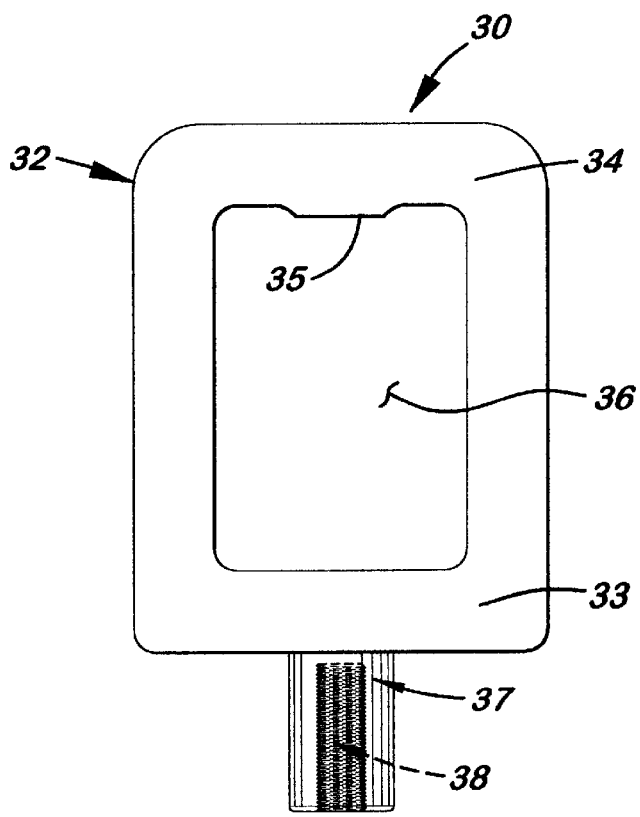
FIG. 6 is a front elevational view of the upper frame member.
Figure 7:
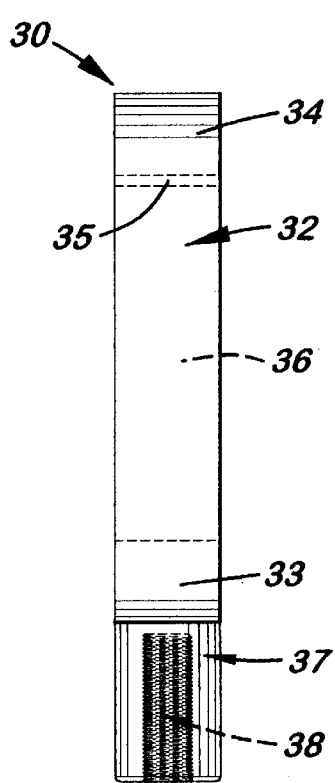
FIG. 7 is a side elevation view of the upper frame member.
Figure 13:
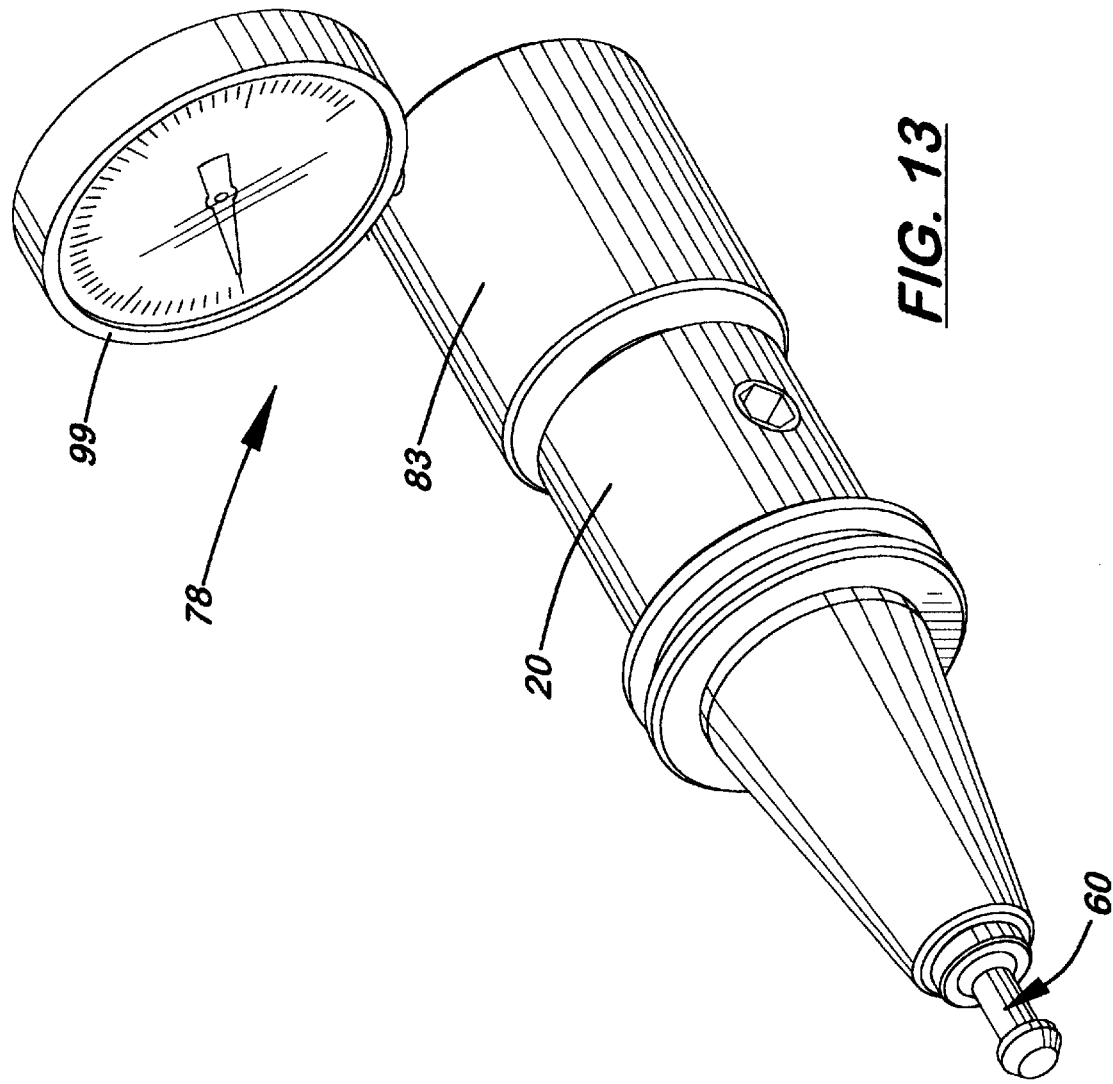
FIG. 13 is a perspective view of a second embodiment of the spindle tool holder tension kit.
Figure 14:
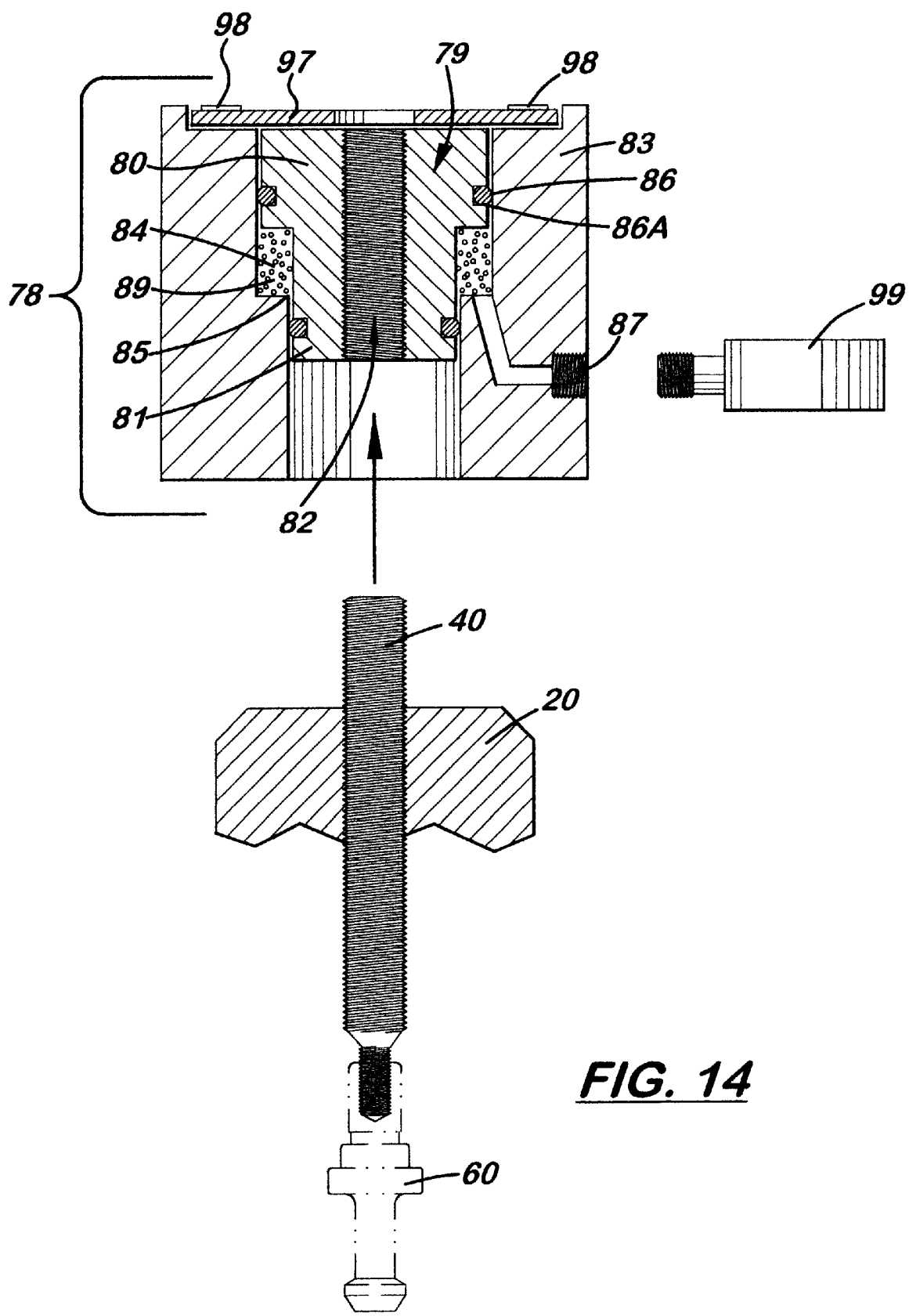
FIG. 14 is a side sectional side elevational view of the spindle tool holder tension kit shown in FIG. 13.

The tool holder 20 is similar to a standard tool holder used with milling machinery. As shown more clearly in FIGS. 4 and 5, the tool holder 20 includes an upper cylindrical section 21 and an integrally formed lower conical section 24. Extending longitudinally through the two sections 21, 24 is a fully extending central bore 22. The upper portion of the bore 22 formed in the upper section 21 is a wide, concentrically aligned, cylindrical cavity 25 designed to receive the neck 37 formed on the upper frame member 30, discussed further below. The lower portion of the bore 22 is designed to slidingly receive the modified pull stud 60. The modified pull stud 60 is not threadingly connected to the tool holder 20. During use the lower conical section 24 of the tool holder 20 is inserted into the conical receiving space 13 formed on the drawbar assembly 14, as shown in FIG. 3.

The transfer rod 40 is an elongated structure designed to slide longitudinally inside the central bore 22 formed in the tool holder 20. The transfer rod 40, shown more clearly in FIG. 8, includes an upper section 43, approximately ½ inch in diameter and approximately 7¼ inches in length, and a lower narrow section 45, approximately ⅜ inch in diameter and ¾ inch in length. Both the upper and lower sections 43, 45 have external threads 44, 46, (0.500-20 UNF-2A), (0.375-16 UNF-2A), respectively, formed thereon.

Standard pull studs 90, shown in FIG. 9, used with tool holders 20 include an upper cylindrical body 92 with external threads 93, a wide middle stop surface 94, a wrench tightening surface 95, and a retention knob 96. Pull studs 90, which are available in various diameters and lengths for connection to different drawbar assemblies used on different machines, are threadingly connected to a threaded bore formed on a standard tool holder. During use, the retention knob 96 engages the coupler 15 on the drawbar assembly 14 on the spindle 12, as shown in FIG. 2.

The modified pull stud 60, as shown in FIG. 10, is identical to a standard pull stud 90 except the external threads 93 are removed so that the upper body 62 may slide longitudinally into the central bore 22 on the tool holder 20. Also formed longitudinally inside the upper body 62 is a threaded bore 63 designed to connect to the external threads 46 formed on the lower section 45 of the transfer rod 40. During use, the transfer rod 40 and modified pull stud 60 are threadingly connected together and disposed longitudinally inside the tool holder 20. The modified pull stud middle stop surface 64 presses against the first end of the tool holder 20 to prevent the modified pull stud 60 from advancing into the central bore 22. A wrench may then be placed around the wrench-tightening surface 65 to manually tighten the modified pull stud 60 to the transfer rod 40. When properly assembled, the pull stud retention knob 66 extends from the first end of the tool holder 20 and connects to a coupler 15.

A force-exerting means 70 is used to exert a pulling force on the transfer rod 40. In the first embodiment, the force-exerting means 70 includes an upper frame member 30, a clevis member 50, and a pressure jack 72. During operation, the pressure jack 72 selectively exerts pressure against the contact surface 75 on the upper frame member 30 and the upper surface 58 of the clevis member 50. The upper frame member 30 has a flat, square-shaped body 32 and a perpendicularly aligned cylindrical neck 37 extending downward therefrom. Formed inside the neck 37 is a threaded bore 38 designed to attach to the distal end of a transfer rod 40 which is inserted longitudinally into the central bore 22 formed on a tool holder 20. The frame member body 32 includes a central, square or rectangular opening 36 with parallel lower and upper horizontal members 33, 34, respectively. Disposed over the lower horizontal member 33 is a U-shaped clevis member 50 which fits closely in an inverted position over the lower horizontal member 33. Formed centrally on the upper horizontal member 34 is a central, downward-protruding contact surface 35 which the plunger 74 of the pressure jack 72 presses against during use.

In the first embodiment, the clevis member 50 is cylindrical in shape and includes a U-shaped cutout 51 with sufficient width and length to allow the clevis member 50 to slide freely over the lower horizontal member 33. During assembly, the external threads 44 connect to the threaded bore 38 formed on the neck 37. The length of the neck 37 and the length of the legs 52, 54 on the clevis member 50 are sufficient so that the distal ends of the legs 52, 54, respectively, press against the surface of the second end 27 of the tool holder 20 when the transfer rod 40 is tightly connected to the neck 37. When properly assembled, the inside surface 56 of the U-shaped cutout 51 and the lower horizontal member 33 are parallel so that force exerted on the upper surface 58 of the clevis member 50 is transferred directly to the second end 27 of the tool holder 20. The clevis member 50 is approximately 1¾ inch in length, 1½ inch in diameter, and made of steel. The U-shaped cutout 51 is approximately 0.8 inch in width and 1.3 inch in depth.

In the first embodiment, the pressure jack 72 is hydraulically controlled with a main body 73 and an adjustable plunger 74 extending therefrom. Attached to the main body 73 is a pressure gauge 77 capable of measuring and displaying pressure in 100-lbs.-per-square-inch units. In the preferred embodiment, the area of the contact surface 75 of the plunger 74 is one square inch so that the operator may easily measure the tension force in units commonly used by spindle manufacturers. During use, the pressure jack 72 is disposed inside the central opening 36 on the upper frame member 30 so that the lower surface 76 on the main body 73 opposite the plunger 74 is positioned against the upper surface 58 of the clevis member 50. When the pressure jack 72 is activated, the plunger 74 extends downward and applies force against the contact surface 35 on the upper frame member 30 and on the clevis member 50. The ends of the legs 52, 54 on the clevis member 50 press against the second end 27 of the tool holder 20. Because the transfer rod 40 is attached to the neck 37, the modified pull stud 60 is pulled outward through the bore 22 on the tool holder 20. When the force exceeds the hold force of the coupler 15 on the modified pull stud retention knob 66, the pull stud 60 disengages from the coupler 15. By reviewing the pressure gauge 77 reading at the moment of disengagement, or by determining whether the modified pull stud 60 is engaged at the recommended factory setting, the operator can determine whether the drawbar assembly 14 is safe to use or whether it requires maintenance or repair.

In a second embodiment, upper flame member 30 and clevis member 50 are replaced with a sealed measurement unit 78. The pressure gauge 77 is also replaced with a pressure line gauge 99. The sealed measurement unit 78 includes a piston 79 that threadingly connects via a threaded bore 82 to the distal end of the transfer rod 40. The piston 79 is designed to move longitudinally inside a cylindrical body 83 that is longitudinally aligned and disposed over the distal end of the tool holder 20. The cylindrical body 83 includes a longitudinally aligned central cavity 84 designed to receive the piston 79. Formed at the mid-point of the central cavity 84 is a circular narrow edge 85 which acts as a stop surface to prevent downward movement of the piston 79 inside the cylindrical body 83. The piston 79 includes a large diameter upper section 80 and an integrally formed smaller diameter lower section 81. Formed on the upper and lower sections 80, 81, respectively, are two spaced apart, circular recessed surfaces 86 that receive O-rings 86A. Attached via screws 98 over the top opening of the cylindrical body 83 is a flat cover 97 which seals and holds the piston 79 inside the cylindrical body 83. Formed on the cylindrical body 83 is a gauge opening 87 that communicates with the cavity 84 formed between the inside surfaces of the cylindrical surfaces of the body 83 and the lower surface of the piston 79. During operation, a hydraulic fluid 89 is placed inside the cavity 84 and a pressure line gauge 99 is attached to the gauge opening 87. When the piston 79 is tightened on the transfer rod 40, hydraulic pressure inside the cavity 84 rises which may be measured by the pressure line gauge 99. In the preferred embodiment, the surface area of the piston 79 and the narrow edge 85 is exactly one square inch and the pressure line gauge 99 is calibrated so that the user may easily read and determine the amount of pressure exerted by square inch of surface area.

Using the above kit 10, a method for testing the tension strength of a coupler 15 used in a drawbar assembly 14 and used to hold a tool holder 20 is provided comprising the following steps:

a. selecting a spindle testing kit 10 which includes a modified pull stud 60 capable of connecting to a drawbar assembly 14, a transfer rod 40 longitudinally aligned inside a tool holder 20, a force-exerting means 70 used to exert pulling force on said tool holder 20 and the transfer rod 40, and a force-measuring means connected to the force-exerting means 70;

b. assembling the transfer rod 40, the pull stud 60, the force-exerting means 70, and the force-measuring means on the tool holder 20;

c. inserting the modified pull stud 60 into the drawbar assembly 14;

d. activating the force-exerting means 70 to apply a separation pressure on the tool holder 20 and the transfer rod 40; and, e. measuring the amount of force exerted by the force-exerting means 70 to determine if the drawbar assembly 14 holds the modified pull stud 60 within factory limits.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A spindle tool holder tension testing kit to measure the holding force on a coupler and drawbar assembly on a spindle, said kit comprising:

a. a tool holder that connects to a drawbar assembly, said tool holder having a longitudinally aligned bore and first and second opposite ends;

b. a transfer rod disposed longitudinally inside said bore of said tool holder, said transfer rod having first and second opposite ends;

c. a modified pull stud inserted into the first end of said tool holder and attached to said first end of said transfer rod when said transfer rod is longitudinally aligned and disposed inside said tool holder;

d. a force-exerting means attached to said second end of said transfer rod and used to apply a pulling force on said second end of said transfer rod; and, e. a force-measuring means coupled to said force-exerting means to indicate the amount of pulling force exerted on said transfer rod by said force-exerting means.

2. The testing kit as recited in claim 1, wherein said force-exerting means is an upper frame member, a clevis member, and a pressure jack, said upper frame member being attached to said second end on said transfer rod, said upper frame having parallel, transversely aligned upper and lower members and a central opening formed thereby, said clevis member being located inside said central opening and disposed over said lower member, said clevis member being sufficient in length to press against said tool holder when disposed over said lower member, said piston gauge being disposed between said clevis member and said upper frame member and selectively operated to exert a pulling force on said transfer rod.

3. The testing kit as recited in claim 2, wherein said force-measuring means is a pressure gauge coupled to said force-exerting means to measure the amount of pulling force exerted on said transfer rod.

4. The testing kit as recited in claim 3, further including said pressure gauge being calibrated to indicate the amount of force exerted on one square inch surface area.

5. The testing kit as recited in claim 4, further including said pressure gauge including a plunger with a contact surface area of one square inch.

6. The testing kit, as recited in claim 1, wherein said force-exerting means is a sealed measurement unit that includes a piston disposed inside a sealed cylindrical body located adjacent to said second end of said tool holder, said piston being connected to said second end of said transfer rod and capable of moving longitudinally inside a fluid filled cavity formed inside a cylindrical body located adjacent to the top surface of said tool holder.

7. The testing kit, as recited in claim 6, wherein said force-measuring means is a pressure gauge coupled to said cavity inside said cylindrical body, said pressure gauge used to measure the fluid pressure created inside said cavity.

8. A spindle tool holder tension testing kit to measure the holding force on a coupler and drawbar assembly on a spindle, said kit comprising;
  a. a tool holder that inserts into the conical, recessed opening on a drawbar assembly, said tool holder having a longitudinally aligned bore formed therein and first and second opposite ends;
  b. a transfer rod disposed longitudinally inside said bore in said tool holder, said transfer rod having a first and second opposite ends;
  c. an upper frame attached to said second end on said transfer rod, said upper frame having parallel upper and lower members and a central opening;
  d. a clevis member disposed inside said central opening and over said lower member, said clevis member being sufficient in length to press against the second end of said tool holder;
  e. a force-exerting means disposed inside said central opening and between said upper and lower members, said force-exerting means used to apply a separating force against said clevis member and said upper member on said upper frame to pull said transfer rod longitudinally through said tool holder; and,
  f. a pull stud attached to said first end of said transfer rod that attaches to the coupler on the spindle.

9. The testing kit as recited in claim 8, wherein said force-exerting means is a piston gauge disposed between said clevis member and said upper frame member that is selectively operated to exert force on said clevis member.

10. The testing kit as recited in claim 9, further including said piston gauge including a moving plunger with a contact surface one square inch.

11. The spindle tool holder tension kit as recited in claim 9, wherein said pull stud is threadingly connected to said second end of said transfer rod.

12. The spindle tool holder tension kit as recited in claim 7, wherein said upper frame is threadingly connected to said transfer rod.

13. A method for testing the holding force on a spindle, comprising the following steps:
  a. selecting a spindle testing kit which includes a modified pull stud capable of fitting into the distal end opening on a tool holder, a transfer rod capable of extending through the spindle and connecting to said modified pull stud inserted into the end of the tool holder, a force-exerting means attached to the end of the transfer rod, and a force-measuring coupled to said force-exerting means;
  b. selecting a tool holder;
  c. assembling said spindle kit by inserting said transfer rod into said tool holder, attaching said modified pull stud to the first end of said transfer rod, and attaching said force-exerting means to said transfer rod in the kit;
  d. attaching said modified pull stud to the spindle on the drawbar assembly;
  e. activating said force-exerting means to apply a pulling force on said transfer rod; and,
  e. measuring the amount of force exerted by said force-exerting means using said force-measuring means.

14. The method as recited in claim 13, wherein said force-exerting means includes an upper frame member, a clevis member, and a pressure jack, said upper frame member being attached to said second end on said transfer rod, said upper frame having parallel, transversely aligned upper and lower members and a central opening formed thereby, said clevis member being located inside said central opening and disposed over said lower member, said clevis member being sufficient in length to press against said tool holder when disposed over said lower member, said piston gauge being disposed between said clevis member and said upper frame member and selectively operated to exert a pulling force on said transfer rod.

15. The method as recited in claim 14, wherein said force-measuring means is a pressure gauge coupled to said force-exerting means to measure the amount of pulling force exerted on said transfer rod.

16. The method as recited in claim 15, wherein said pressure gauge is calibrated to indicate the amount of force exerted on one square inch surface area.

17. The testing kit, as recited in claim 13, wherein said force-exerting means is a sealed measurement unit that includes a piston disposed inside a sealed cylindrical body located adjacent to said second end of said tool holder, said piston being connected to said second end of said transfer rod and capable of moving longitudinally inside a fluid filled cavity formed inside a cylindrical body located adjacent to the top surface of said tool holder.

18. The testing kit, as recited in claim 17, wherein said force-measuring means is a pressure gauge coupled to said cavity inside said cylindrical body, said pressure gauge used to measure the fluid pressure created inside said cavity.

19. The testing kit as recited in claim 18, further including said pressure gauge includes a plunger with a contact surface area of one square inch.

* * * * *